(12) United States Patent
Bandyopadhyay et al.

(10) Patent No.: US 9,581,113 B2
(45) Date of Patent: Feb. 28, 2017

(54) FUEL INJECTION NOZZLE HAVING AN ANTI-LEAKAGE DEVICE

(71) Applicant: ELECTRO-MOTIVE DIESEL, INC., LaGrange, IL (US)

(72) Inventors: Deep Bandyopadhyay, Naperville, IL (US); Farhan F. Devani, Morton Grove, IL (US); John P. Timmons, Chillicothe, IL (US)

(73) Assignee: Electro-Motive Diesel, Inc., La Grange, IL (US)

( * ) Notice: Subject to any disclaimer, the term of this patent is extended or adjusted under 35 U.S.C. 154(b) by 12 days.

(21) Appl. No.: 14/684,320

(22) Filed: Apr. 10, 2015

(65) Prior Publication Data

US 2016/0298588 A1    Oct. 13, 2016

(51) Int. Cl.
| | | |
|---|---|---|
| F02M 21/02 | (2006.01) | |
| F02M 61/14 | (2006.01) | |
| F02D 19/06 | (2006.01) | |
| F02D 41/00 | (2006.01) | |

(52) U.S. Cl.
CPC ..... *F02M 21/0275* (2013.01); *F02D 19/0642* (2013.01); *F02D 19/0647* (2013.01); *F02M 21/02* (2013.01); *F02M 61/14* (2013.01); *F02D 41/0025* (2013.01); *F02D 41/0027* (2013.01)

(58) Field of Classification Search
CPC  F02M 21/02; F02M 21/0275; F02D 19/0642; F02D 19/0647; F02D 19/0692; F02D 19/0694; F02D 19/081; F02D 41/0025; F02D 41/0027

USPC .... 123/445, 27 GE, 525, 526, 527–530, 531
See application file for complete search history.

(56) References Cited

U.S. PATENT DOCUMENTS

| | | |
|---|---|---|
| 3,572,297 A | 3/1971 | Murray |
| 4,977,875 A | 12/1990 | Kumagai et al. |
| 5,085,176 A * | 2/1992 | Brinkley, III ........... F02B 43/10 123/3 |
| 5,596,969 A | 1/1997 | Lipinski |
| 5,632,253 A | 5/1997 | Paul et al. |
| 5,755,210 A | 5/1998 | Sato et al. |
| 5,775,599 A * | 7/1998 | Smith ................ F02M 21/0272 239/584 |
| 7,284,543 B2 | 10/2007 | Kato et al. |
| 7,506,638 B2 | 3/2009 | Shinkarenko et al. |
| 8,191,530 B2 | 6/2012 | Gruber et al. |
| 8,899,500 B2 | 12/2014 | Kuzuma et al. |
| 2008/0006713 A1* | 1/2008 | Parish ................ F02M 21/0263 239/5 |
| 2011/0186654 A1* | 8/2011 | Fujita ................ F02M 51/0682 239/584 |
| 2013/0098333 A1 | 4/2013 | Kim et al. |
| 2013/0133624 A1 | 5/2013 | Hirose et al. |
| 2014/0116375 A1 | 5/2014 | Kim et al. |
| 2014/0116388 A1 | 5/2014 | Foege et al. |
| 2014/0238350 A1 | 8/2014 | Fiveland et al. |
| 2014/0338633 A1 | 11/2014 | Fern |

(Continued)

FOREIGN PATENT DOCUMENTS

| | | |
|---|---|---|
| DE | 102011003909 A1 | 8/2012 |
| WO | 02101230 A1 | 12/2002 |

*Primary Examiner* — Mahmoud Gimie

(57) ABSTRACT

A nozzle for a gaseous fuel injector has a converging portion, a tip connected to the converging portion, and an anti-leakage device disposed at the tip to selectively inhibit leakage of a residual gaseous fuel from the nozzle.

20 Claims, 3 Drawing Sheets

(56) References Cited

U.S. PATENT DOCUMENTS

2015/0377184 A1\* 12/2015 Poapdiuc ............ F02D 19/0681
                                                        123/299

\* cited by examiner

FUEL INJECTION NOZZLE HAVING AN ANTI-LEAKAGE DEVICE

TECHNICAL FIELD

The present disclosure is directed to a fuel injection nozzle and, more particularly, to a fuel injection nozzle having an anti-leakage device.

BACKGROUND

Due to the rising cost of liquid fuel (e.g., diesel fuel) and ever increasing restrictions on exhaust emissions, engine manufacturers have developed dual-fuel engines. An exemplary dual-fuel engine provides injections of a low-cost gaseous fuel (e.g. natural gas) through air intake ports of the engine's cylinders. The gaseous fuel is introduced with clean air that enters through the intake ports and is ignited by liquid fuel that is separately injected during each combustion cycle. Because a lower-cost fuel is used together with liquid fuel, cost efficiency may be improved. In addition, the combustion of the gaseous and liquid fuel mixture may result in a reduction of harmful emissions.

In these dual-fuel engines, use of a gaseous fuel injector in addition to a liquid fuel injector may necessitate inclusion of one or more gaseous fuel control valves to control the flow of the gaseous fuel into the combustion chamber. However, operation of the control valves may result in residual gaseous fuel at one or more locations along a gaseous fuel pathway after the control valves close, such as in a gaseous fuel injection nozzle. Since the gaseous fuel injection nozzles may be a different shape than the air intake ports in which they are located, this residual gaseous fuel may leak from the nozzle after the valve closes. The leaked fuel can become undesirable waste or contaminate a subsequent injection event.

One method of handling the difficulties presented by fuel leaking from injection nozzles is described in U.S. Patent Application Publication No. 2014/0338633 (the '633 application) published in the name of Fern on Nov. 20, 2004. The '633 application describes a fuel injection assembly having a nozzle portion with a seal member that allows the nozzle portion to be secured within an injector aperture formed within a cylinder of an engine. The nozzle portion is provided with a tiered portion that allows the nozzle portion to fit various configurations of injector apertures of combustion chambers having various sizes.

Although the system of the '633 application may address some of the drawbacks associated with residual fuel located in fuel injection nozzles, it may not be adequate for all applications. For example, in systems that include a gaseous fuel injector located in an air box, it may not be practical to use a nozzle that encompasses the entire air intake port because this arrangement would prevent air from also being injected through the port.

The disclosed nozzle is directed to addressing one or more of the problems set forth above and/or other problems of the prior art.

SUMMARY

In one aspect, the present disclosure is directed to a nozzle for a gaseous fuel injector including a converging portion, a tip connected to the converging portion, and an anti-leakage device disposed at the tip to selectively inhibit leakage of a residual gaseous fuel from the nozzle.

In another aspect, the present disclosure is directed to a fuel system for an engine having a cylinder. The fuel system includes an inlet air port fluidly coupled to the cylinder and a gaseous fuel injector disposed at the inlet air port and configured to inject gaseous fuel into the cylinder through the inlet air port. The gaseous fuel injector includes a nozzle having a converging portion and a tip connected to the converging portion. The tip has a cross-sectional shape that conforms to at least 80-95% of an upper half of the shape of the inlet air port.

In another aspect, the present disclosure is directed to an engine including an engine block at least partially defining a plurality of cylinders and an air box connected to a side of the engine block. The engine also includes a cylinder liner disposed in each of the plurality of cylinders and having a plurality of air intake ports in communication with the air box. A gaseous fuel injector is associated with each cylinder of the plurality of cylinders and includes a nozzle having a converging portion and a tip with a cross-sectional shape consuming about 80-95% of an upper half of one of the plurality of air intake ports. An anti-leakage device is configured to couple to the tip and to selectively inhibit leakage of a residual gaseous fuel from the nozzle.

DETAILED DESCRIPTION

Figure 1:
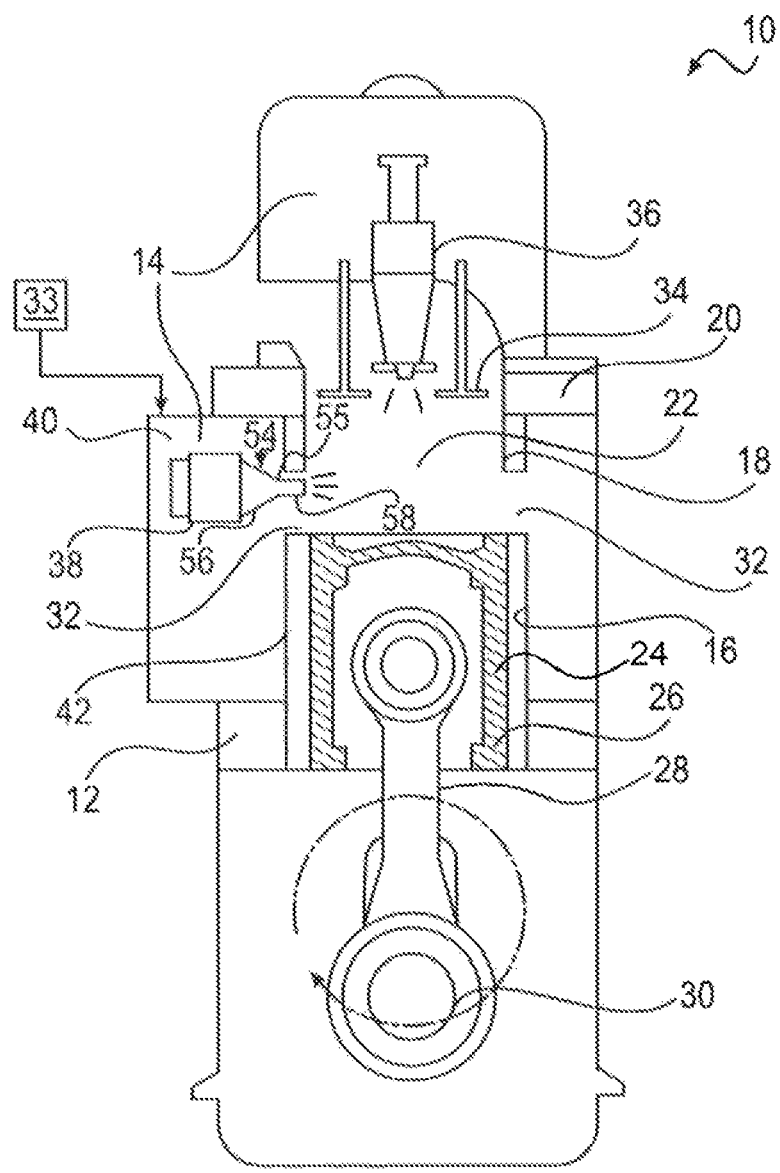
FIG. 1 is a schematic and cross-sectional illustration of an exemplary engine.

FIG. 1 illustrates an exemplary internal combustion engine 10. The engine 10 is depicted and described as a two-stroke dual-fuel engine. The engine 10 may include an engine block 12 that at least partially defines a plurality of cylinders 16 (only one shown), each having an associated cylinder head 20. A cylinder liner 18 may be disposed within each engine cylinder 16, and cylinder head 20 may close off an end of the cylinder liner 18.

A piston 24 may be slidably disposed within each cylinder liner 18. Each cylinder liner 18, the cylinder head 20, and the piston 24 may together define a combustion chamber 22 that receives fuel from a fuel system 14 mounted to the engine 10. It is contemplated that the engine 10 may include any number of the engine cylinders 16 with corresponding combustion chambers 22.

Within the cylinder liner 18, the piston 24 may be configured to reciprocate between a bottom-dead-center (BDC) or lower-most position, and a top-dead-center (TDC) or upper-most position. In particular, the piston 24 may be an assembly that includes a piston crown 26 pivotally connected to a rod 28, which may in turn be pivotally connected to a crankshaft 30. The crankshaft 30 of the engine 10 may be rotatably disposed within the engine block 12 and each piston 24 coupled to the crankshaft 30 by the rod 28 so that a sliding motion of each piston 24 within the liner 18 results in a rotation of the crankshaft 30. Similarly, a rotation of the crankshaft 30 may result in a sliding motion of the piston 24. As the crankshaft 30 rotates through about 180 degrees, the piston crown 26 and the connected rod 28 may move through one full stroke between BDC and TDC. The engine 10, being a two-stroke engine, may have a complete cycle that includes a power/exhaust/intake stroke (TDC to BDC) and an intake/compression stroke (BDC to TDC).

During a final phase of the power/exhaust/intake stroke described above, air may be drawn into the combustion chamber 22 via one or more gas exchange ports (e.g., air intake ports) 32 located within a sidewall of the cylinder liner 18. In particular, as the piston 24 moves downward within the liner 18, a position will eventually be reached at which the air intake ports 32 are no longer blocked by the piston 24 and instead are fluidly coupled to the combustion chamber 22. When the air intake ports 32 are in fluid communication with the combustion chamber 22 and a pressure of air at the air intake ports 32 is greater than a pressure within the combustion chamber 22, air will pass through the air intake ports 32 into the combustion chamber 22. Gaseous fuel (e.g., methane or natural gas) may be introduced into the combustion chamber 22 (e.g., radially injected) through at least one of the air intake ports 32. The gaseous fuel may mix with the air to form a fuel/air mixture within the combustion chamber 22.

At some point, the piston 24 will start an upward movement that blocks the air intake ports 32 and compresses the air/fuel mixture. As the air/fuel mixture within the combustion chamber 22 is compressed, a temperature of the mixture may increase. At a point when the piston 24 is near TDC, a liquid fuel (e.g., a diesel or other petroleum-based liquid fuel) may be injected into combustion chamber 22 via a liquid fuel injector 36. The liquid fuel may be ignited by the hot air/fuel mixture, causing combustion of both types of fuel and resulting in a release of chemical energy in the form of temperature and pressure spikes within the combustion chamber 22. During a first phase of the power/exhaust/intake stroke, the pressure spike within the combustion chamber 22 may force the piston 24 downward, thereby imparting mechanical power to the crankshaft 30. At a particular point during this downward travel, one or more gas exchange ports 34 (e.g., exhaust ports) located within the cylinder head 20 may open to allow pressurized exhaust within the combustion chamber 22 to exit, and the cycle will restart.

The liquid fuel injector 36 may be positioned inside the cylinder head 20 and configured to inject liquid fuel into a top of the combustion chamber 22 by releasing fuel axially toward an interior of the cylinder liner 18 in a generally cone-shaped pattern. The liquid fuel injector 36 may be configured to cyclically inject a fixed amount of liquid fuel, for example, depending on a current engine speed and/or load. In one embodiment, the engine 10 may be arranged to run on liquid fuel injections alone or a smaller amount of liquid fuel mixed with the gaseous fuel.

One or more air intake ports 32 may be fluidly coupled to an air supply 33 by way of an air box 40. The air supply 33 may be configured to supply air to the air box 40, for example, when the ports 32 are open to drive fresh air into the bore of the cylinder 16. In one embodiment, the air box 40 may be fluidly coupled to the outlet of an air compressor, which may be part of the air supply 33 and/or part of an exhaust-driven turbocharger or supercharger.

The gaseous fuel may be injected through the air intake port 32 into the combustion chamber 22 via any number of gaseous fuel injectors 38. The gaseous fuel injectors 38 may be mounted directly to a wall 42 of the engine block 12 inside of the air box 40 or to the cylinder liner 18, such that a nozzle 54 of gaseous fuel injector 38 is in fluid communication with one of the air intake ports 32 of the adjacent engine cylinder 16. The gaseous fuel may be injected radially into the combustion chamber 22 through a corresponding air intake port 32 after the air intake port 32 is opened by movement of the piston 24. The amount of gaseous fuel injected into the combustion chamber 22 may vary based on the engine load and/or speed.

In some embodiments, the gaseous fuel injector 38 may have a body 55 defining the type and/or shape of the nozzle 54. For example, in the embodiment of FIG. 1, the injector 38 is depicted as having a converging nozzle, in which the body 55 has a converging portion 56 and a tip 58 connected at a distal end of the converging portion 56. The tip 58 may create an axial flow path for gaseous fuel directed towards the center axis of the cylinder 16. The converging portion 56 may increase upstream pressures of gaseous fuel to be injected into the cylinder 16 through the downstream tip 58. The converging portion 56 may have an included angle of about 60° relative to a center axis, with other angles in the range of about 50° to 70° possible. A pressure of injected gaseous fuel may be higher than that of the air inducted into the cylinder 16 from the air box 40, for example, approximately 2-4 bar greater than the inducted air. This pressure differential may be necessary to allow gaseous fuel to enter the cylinder 16 during the time that the air intake ports 32 are open and to overcome the flow of air from the air box 40 through the surrounding air intake ports 32. It is also possible for the higher pressure fuel to help pull air into the cylinder 16 while the air intake ports 32 are open.

Unless otherwise indicated, the terms "about" and "approximately" mean that the values being modified are intended to encompass both the value stated as well as normal manufacturing tolerances around the stated value.

In some embodiments, the nozzle 54 may be selectively positioned with respect to the air intake port 32 to reduce or eliminate the amount of gaseous fuel remaining in the nozzle 54 after the air intake ports 32 close. For example, in the depicted embodiment, the tip 58 of the nozzle 54 may be positioned within an upper half of the air intake port 32. Further, although the body 55 of the nozzle 54 in FIG. 1 includes a tip 58 at the distal end, in other embodiments, the nozzle 54 may alternatively terminate in an aperture aligned with the upper half of the air intake port 32.

Figure 2:
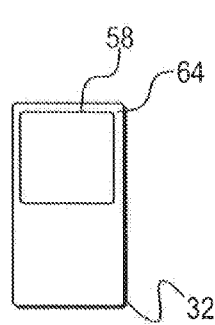
FIGS. 2 and 3 are cross-sectional illustrations of exemplary disclosed nozzles that may be used with the engine of FIG. 1.
Figure 3:
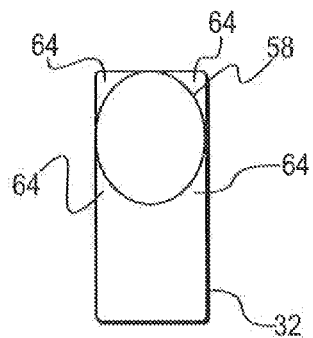

As shown in FIGS. 2 and 3, the cross-sectional shape of the tip 58 of the nozzle 54 may be designed to at least partially conform to the shape of the air intake port 32. For example, as shown in FIG. 2, the tip 58 may have a cross-sectional square or rectangular shape conforming to the upper half of the air intake port 32. More specifically, the cross-sectional shape of the tip 58 may cover approximately 80-95% of the area in the top half of the air intake port 32 leaving only cross-sectional space 64 uncovered. In other words, only about 5-20% of the upper half of the air port 32 may be left open to the air box 40.

As shown in FIG. 3, the tip 58 may have a cross-sectional oval shape conforming to the upper half of the air intake port 32. Like the square embodiment of FIG. 2, the oval cross-sectional shape of FIG. 3 may also cover approximately 80-95% of the area in the top half of the air intake port 32. Further, in some embodiments, the oval-shaped tip 58 may contact at least two walls of the air intake port 32.

The extent to which the cross-sectional area of the tip 58 of the nozzle 54 conforms to the upper half of the air intake port 32 may vary in different embodiments, depending on implementation-specific considerations. For example, in one embodiment, the cross-sectional area of the tip 58 may completely fill in the top half of the air intake port 32.

Figure 4:
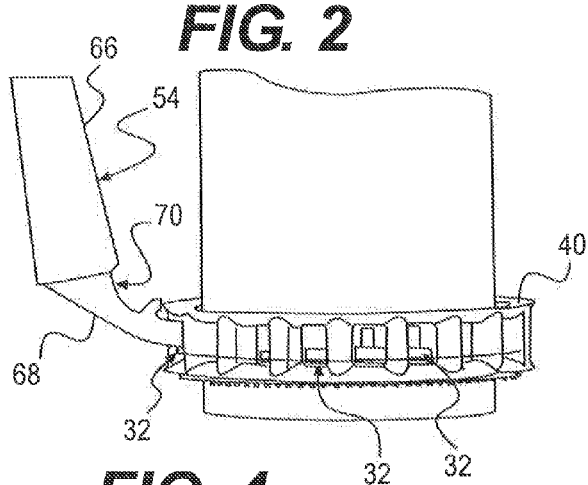
FIGS. 4 and 5 are side perspective views of the exemplary nozzles of FIGS. 2 and 3.

FIG. 4 illustrates another embodiment of the nozzle 54 of the gaseous fuel injector 38 coupled to the air intake port 32. In this embodiment, the nozzle 54 is a low-volume nozzle having an upper portion 66 and a lower portion 68. The upper portion 66 connects to the lower portion 68 at an interface 70, and the lower portion 68 directs the gaseous fuel from the upper portion 66 through the air intake port 32.

Figure 5:
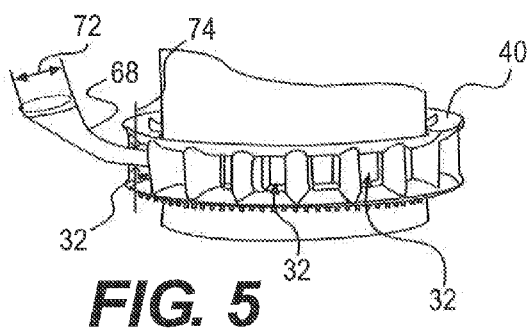

As shown in FIG. 5, an inlet diameter 72 of the lower portion 68 may be selected to interface with the upper portion 66, but may have a smaller diameter at other positions along its length. For example, the diameter of the lower portion 68 may be gradually reduced along the length of the lower portion 68. As such, a diameter 74 of the lower portion 68 at the inlet of the air intake port 32 may less than the inlet diameter 72 at which the gaseous fuel was received into the lower portion 68. This decreased diameter 74 may enable a reduction in the amount of residual gaseous fuel that may leak from the nozzle 54 after the air intake ports 32 close, because a pressure drop through the nozzle 54 may be reduced.

Figure 6:
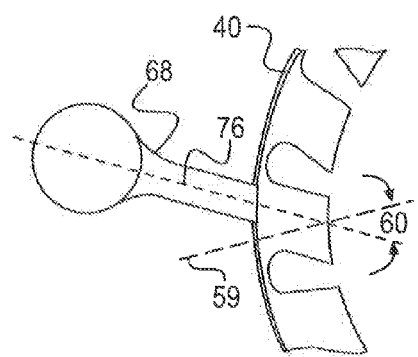
FIGS. 6 and 7 are views of the exemplary nozzle of FIGS. 2-5.

Further, the lower portion 68 of the nozzle 54 may be positioned such that gaseous fuel is injected along an injection axis 76, as shown in FIG. 6. In some embodiments, the injection axis 76 for the gaseous fuel may be aligned with an injection axis 59 for the air injected into the air intake port 32. In the depicted embodiment, however, the nozzle 54 is angled differently than the air intake port 32. In particular, the lower portion 68 of the nozzle 54 may be oriented generally towards the axis of cylinder liner 18 or at a horizontal first oblique angle 60 with respect to air flow through the air intake ports 32. The air intake ports 32 may be positioned to direct air flow at an oblique horizontal angle of about 20-25 degrees (e.g., about 18 degrees) between the injection axis 76 and the injection axis of the air injected into the air intake port 32.

Figure 7:
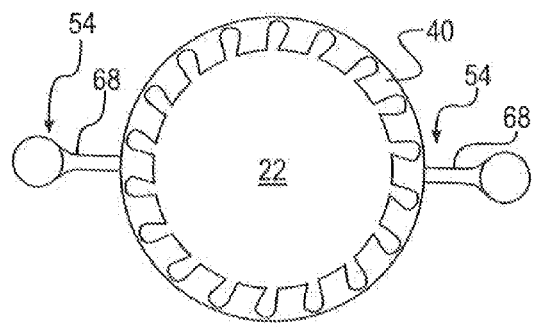

As shown in FIG. 7, in some embodiments, multiple gaseous fuel injectors 38 having multiple nozzles 54 may be associated with each cylinder 16. FIG. 7 illustrates an embodiment in which two nozzles 54, each having a respective lower portion 68, are positioned on opposite sides of the combustion chamber 22. When multiple gaseous fuel injectors 38 are used in this manner, the lower portions 68 of the nozzles 54 may be positioned within generally opposing cylinder air intake ports 32, such that streams of fuel injected by these nozzles 54 collide with each other inside of the combustion chamber 22. A collision of two streams of fuel injected by the nozzles 54 may promote gaseous fuel retention and mixing inside the cylinder 16. Further, utilization of multiple nozzles 54 may enable fuel stream interactions that help to prevent gaseous fuel from escaping the combustion chamber 22 through an opposing air intake port 32.

Further, it should be noted that although two opposing nozzles 54 are illustrated in FIG. 7, in other embodiments, any desired number of nozzles 54 may be employed. For instance, a third nozzle 54 may be positioned within a third air intake port 32 of the cylinder 16 and be configured to inject additional gaseous fuel into the combustion chamber 22. Additionally, the nozzles 54 may be provided in any desired pattern about the combustion chamber 22. For example, the nozzles 54 may be evenly spaced or staggered around the cylinder 16 to create a desired spray pattern.

Additionally, the injection of gaseous fuel from each nozzle 54 may occur substantially simultaneously or at different times, such that an injection from one nozzle 54 begins after the injection from another nozzle 54 has already begun. Further, one nozzle 54 may inject a larger quantity of fuel than another nozzle 54 during a given cycle. Other quantities and arrangements of multiple nozzles 54 are within the scope of presently contemplated embodiments.

Figure 8:
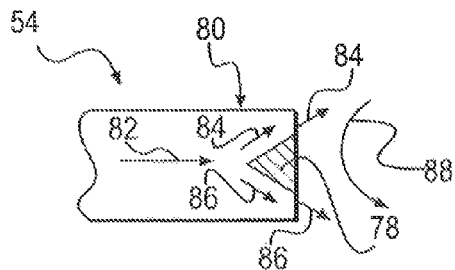
FIG. 8 is a schematic view of an exemplary diverter that may be used in conjunction with the nozzles of FIGS. 2-7.

FIG. 8 is a schematic illustration of a diverter 78 that may be positioned at the tip 58 of the nozzle 54. The diverter 78 may be configured to divide a stream of gaseous fuel 82 into a first stream 84 and a second stream 86. In one example, the first stream 84 is injected into the combustion chamber 22 in a direction opposing a flow 88 within the combustion chamber 22. The second stream 86 is injected into the combustion chamber 22 along the direction of the flow 88 within the combustion chamber 22.

Figure 9:
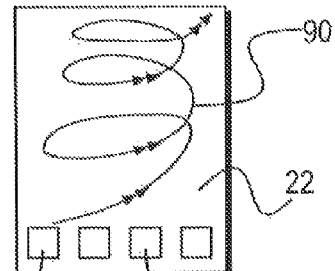
FIG. 9 is a schematic view of an exemplary fluid pathway that may occur when fluid is injected with the exemplary nozzles of FIGS. 2-8.

FIG. 9 illustrates an example of a flow path 90 from the air intake port 32 to a top of the combustion chamber 22 that may be achieved by injecting gaseous fuel into the combustion chamber 22 via the nozzle 54 shown in FIG. 8. In this embodiment, the second stream 86 being injected in the direction of the flow 88 may reach the top of the combustion chamber 22 more quickly than the first stream 84. The first stream 84 may experience better mixing with the flow 88 due to its injection in a direction opposing the flow 88. Further, in some embodiments, the tip 58 may be tilted in an upward direction with respect to the combustion chamber 22 to increase mixing.

Figure 10:
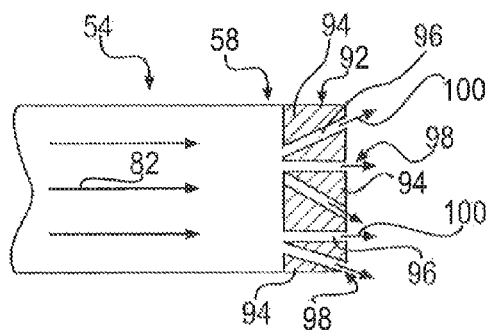
FIG. 10 is a schematic view of an exemplary attachment for the nozzles of FIGS. 2-9.

FIG. 10 is a schematic illustration of another attachment 92 integrated with or connected to the tip 58 of the nozzle 54. The attachment 92 may include a body 94 having a plurality of channels 96 terminating in a plurality of apertures 98. The attachment 92 may be configured in a showerhead type of arrangement configured to inject multiple streams of gaseous fuel 100 into the combustion chamber 22 at different angles. To that end, the stream of gaseous fuel 82 may enter the channels 96 of the attachment 92, which direct the gaseous fuel 82 into the combustion chamber 22 through the plurality of apertures 98.

In some embodiments, the length, quantity, and/or diameter of the channels 96 and/or apertures 98 may be sized based on implementation-specific considerations. For example, in one embodiment, the channels 96 may be eliminated, and the gaseous fuel 82 may flow directly into the apertures 98. The apertures 98 may have a larger diameter and be fewer in number if fewer streams 100 are desired to be injected into the combustion chamber 22, or the apertures 98 may have a smaller diameter and be greater in number to increase the number of streams 100 injected into the combustion chamber 22. The fewer larger streams may increase penetration into the combustion chamber 22, while the greater number of smaller streams may increase mixing.

Figure 11:
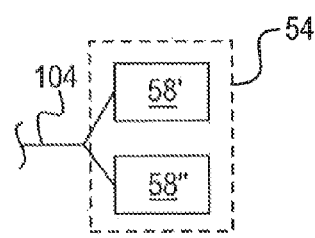
FIG. 11 is a schematic view of an exemplary gas admission valve that may be used in conjunction with the nozzles of FIGS. 2-9.

FIG. 11 is a schematic illustrating a single nozzle 54 having two tips 58' and 58". In this embodiment, a single gaseous fuel stream 104 is divided between the two tips 58' and 58". Each of the two tips 58' and 58" may be disposed in the upper half of a single air intake port 32 or associated with two separated ports 32. By providing two tips 58' and 58" instead of a single tip 58, multiple streams may be injected into the combustion chamber 22 separately, thus increasing mixing in the combustion chamber 22. Although two tips 58' and 58" are illustrated, in other embodiments, any number of tips 58 may be provided.

Figure 12:
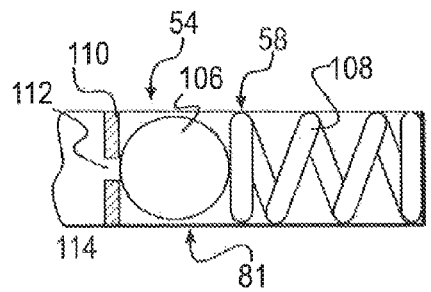
FIGS. 12 and 13 are schematic views of a ball diffuser that may be used in conjunction with the nozzles of FIGS. 2-9.
Figure 13:
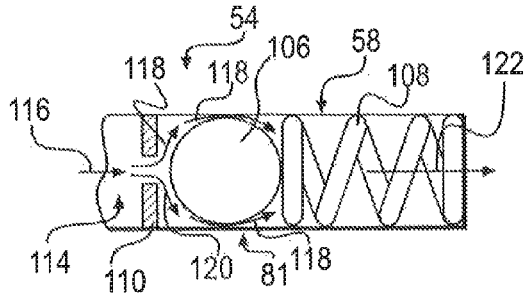

FIGS. 12 and 13 illustrate another embodiment of the nozzle 54 having a ball check valve 81 disposed in or coupled to the tip 58 of the nozzle 54. The ball check valve 81 includes a ball 106 and a spring 108 biasing the ball 106 against a seat 110. The seat 110 includes an aperture 112, through which the gaseous fuel may flow. FIG. 12 illustrates the ball check valve 81 in the closed position when a pressure on a first side 114 of the seat 110 is less than the force exerted on the ball 106 by the spring 108. In this position, the tip 58 of the nozzle 54 may be closed, thus reducing or preventing the likelihood of leakage of residual gaseous fuel from the nozzle 54.

FIG. 13 illustrates the ball check valve 81 in the open position when a pressure on the first side 114 of the seat 110 exceeds the force exerted by the spring 108. In the open position, a gaseous fuel stream 116 flows through the aperture 112 and displaces the ban 106 from its position against the seat 110. The gaseous fuel 116 splits into a cone-shaped stream 118, which flows around the ball 106 and combines into a linear stream 122 that discharges into the combustion chamber 22. When the gaseous fuel 116 is no longer being injected through the nozzle 104, the ball 106 may return to its position against the seat 110, thus blocking residual gaseous fuel in the nozzle, 54 from escaping the tip 58 until the next gaseous fuel injection.

Figure 14:
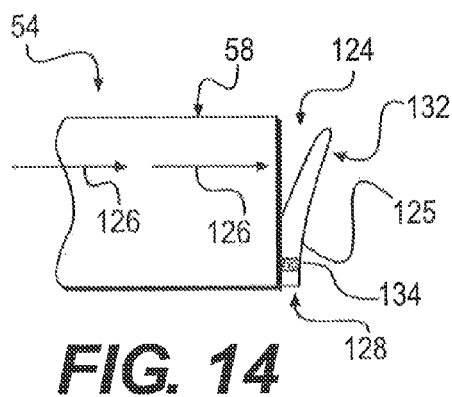
FIG. 14 is a schematic view of a reed valve that may be used in conjunction with the nozzles of FIGS. 2-9.

FIG. 14 is a schematic illustrating an embodiment of the nozzle 54 having a reed valve 124 coupled to the tip 58 of the nozzle 54. The reed valve 124 includes a body 125 having a fixed portion 128 and a flexible or hinged portion 132. The fixed portion 128 is coupled to the tip 58 of the nozzle via a fastener 134, which may be a screw, a bolt, or other securement device. The flexible portion 132 may be biased toward a closed position, during which the flexible portion 132 is flush against the tip 58. However, when a gaseous fuel stream 126 provides a force that displaces the flexible portion 132 during a gaseous fuel injection, the reed valve 124 may be in an open position. The reed valve 124 maintains the residual gaseous fuel within the nozzle 54 when the pressure of a gaseous fuel stream falls below a bias threshold of the flexible portion 132.

INDUSTRIAL APPLICABILITY

The disclosed nozzle 54 may be applicable to any type of gaseous fuel system 14. The nozzle 54, having the tip 58 outfitted with an anti-leakage device, such as the ball check valve 81 or the reed valve 124, may reduce or prevent the likelihood that residual gaseous fuel will leak to the air box 40 when the air intake ports 32 are closed or to the combustion chamber 22 when the air intake ports 32 reopen for a subsequent injection event.

Several advantages over the prior art may be associated with the different embodiments of nozzles 54. For example, by providing the nozzle 54 with a conformal tip 58, the amount of residual gaseous fuel leaking into the surrounding environment due to a mismatch in the shape of the nozzle 54 and the air intake port 32 may be reduced. Further, the amount of residual gaseous fuel that may leak from the nozzle 54 after the air intake ports 32 close may be reduced by utilizing a low-volume nozzle with a reduced pressure drop through the nozzle or by attaching an anti-leakage device to the tip 58.

It will be apparent to those skilled in the art that various modifications and variations can be made to the disclosed fuel injection nozzle. Other embodiments will be apparent to those skilled in the art from consideration of the specification and practice of the disclosed nozzle. It is intended that the specification and examples be considered as exemplary only, with a true scope being indicated by the following claims and their equivalents.

What is claimed is:

1. A nozzle for a gaseous fuel injector, comprising:
   a first body portion including a first flow passage and a gaseous fuel inlet fluidly connected to the first flow passage, the first flow passage defining a first gaseous fuel flow path;
   a converging body portion fixedly connected to the first body portion and including a second flow passage fluidly connected to the first flow passage, the second fuel passage defining a second gaseous fuel flow path, the second gaseous fluid flow path at one or more obtuse angles with the first gaseous fuel flow path;
   a tip portion fixedly connected to the converging portion and including a third flow passage and a gaseous fuel outlet, the third flow passage fluidly connected to the second flow passage; and
   an anti-leakage device disposed in the third flow passage and configured to selectively inhibit leakage of a residual gaseous fuel from the nozzle.

2. The nozzle of claim 1, wherein the tip portion includes an oval cross-section.

3. The nozzle of claim 1, wherein the tip portion includes a rectangular cross-section.

4. The nozzle of claim 1, wherein the anti-leakage device includes a ball check valve.

5. The nozzle of claim 1, wherein the anti-leakage device includes a reed valve.

6. The nozzle of claim 1, further including an attachment coupled to the tip portion and having a plurality of apertures fluidly connected to the third flow passage.

7. The nozzle of claim 1, further including an attachment coupled to the tip portion and having a plurality of channels terminating in a plurality of apertures the plurality of channels fluidly connected to the third flow passage.

8. The nozzle of claim 1, further including a diverter disposed in the third flow passage and configured to direct two or more gaseous fuel streams in separate directions.

9. The nozzle of claim 1, further including a second tip portion fixedly connected to the converging portion and including a fourth flow passage and a second gaseous fuel outlet, the fourth flow passage fluidly connected to the second flow passage.

10. A fuel system for an engine having a cylinder including an inlet air port having an upper half, comprising:
    an inlet air system fluidly coupled to the air port to provide inlet air to the cylinder; and
    a gaseous fuel injector disposed at the upper half of the inlet air port and not projecting into the cylinder, the fuel injector configured to inject gaseous fuel into the cylinder through the inlet air port separately from the inlet air, the gaseous fuel injector comprising:
    a nozzle having a converging portion and a tip connected to the converging portion, wherein the tip has a cross-sectional shape that conforms to at least 80-95% of the shape of the upper half of the inlet air port.

11. The fuel system of claim 10, further including an anti-leakage device configured to couple to the tip and to selectively inhibit leakage of a residual gaseous fuel from the nozzle.

12. The fuel system of claim 10, wherein the tip has a rectangular cross-section.

13. The fuel system of claim 10, wherein the tip has an oval cross-section and is configured to contact at least two walls of the air intake port.

14. The fuel system of claim 10, wherein the anti-leakage device comprises a ball check valve.

15. The fuel system of claim 10, wherein the anti-leakage device includes a reed valve.

16. The fuel system of claim 10, further including a diverter disposed in the tip and configured to direct two or more gaseous fuel streams in separate directions.

17. The fuel system of claim 16, wherein the separate directions include a first direction opposing a fluid flow within the cylinder and a second direction generally aligned with the fluid flow within the cylinder.

18. The fuel system of claim 10, wherein an injection axis of the gaseous fuel injector is generally aligned with an air injection axis of the inlet air port.

19. The fuel system of claim 10, further including an attachment coupled to the tip and having a plurality of channels terminating in a plurality of apertures.

20. An engine comprising:

an engine block at least partially defining a plurality of cylinders;

an air intake system to provide intake air to the plurality of cylinders, the air intake system including an air box connected to a side of the engine block;

a cylinder liner associated with and disposed in each of the plurality of cylinders and having a plurality of air intake ports in fluid communication with the air box;

a gaseous fuel injector associated with each cylinder of the plurality of cylinders and disposed at the upper half of one of the air intake ports associated with the cylinder and not projecting into the cylinder, the fuel injector configured to inject gaseous fuel into the cylinder through the air intake port separately from the inlet air, the fuel injector comprising a nozzle having a converging portion and a tip with a cross-sectional shape consuming about 80-95% of an upper half of one of the plurality of air intake ports; and an anti-leakage device configured to couple to the tip and to selectively inhibit leakage of a residual gaseous fuel from the nozzle.

* * * * *